United States Patent [19]

Degen et al.

[11] Patent Number: 4,804,387
[45] Date of Patent: Feb. 14, 1989

[54] LIQUID BLACK DYE MIXTURE

[75] Inventors: Hans-Juergen Degen, Lorsch; Rudolf Bermes, Ludwigshafen; Sigberg Pfohl, Speyer, all of Fed. Rep. of Germany

[73] Assignee: BASF Aktiengesellschaft, Ludwigshafen, Fed. Rep. of Germany

[21] Appl. No.: 126,259

[22] Filed: Nov. 27, 1987

[51] Int. Cl.$^4$ ............ C09B 67/22; C09B 69/04; C09B 35/21; C09B 56/04
[52] U.S. Cl. ............................ 8/641; 8/437; 8/919
[58] Field of Search .................... 8/641, 437

[56] References Cited

U.S. PATENT DOCUMENTS

| | | | |
|---|---|---|---|
| 4,118,182 | 10/1978 | Smith | 8/527 |
| 4,118,182 | 10/1978 | Smith | 8/527 |
| 4,699,628 | 10/1987 | Patel et al. | 8/641 |
| 4,705,528 | 11/1987 | Baxter et al. | 8/641 |

OTHER PUBLICATIONS

Colour Index (Third Edition), vol. 4: C.I. 19140; C.I. 40000; C.I. 47035.

Primary Examiner—A. Lionel Clingman
Attorney, Agent, or Firm—Oblon, Fisher, Spivak, McClelland & Maier

[57] ABSTRACT

Aqueous dye mixtures for black shades containing as dyes essentially those dyes which have the C.I. number 19,140, 40,000 or 47,035, in the form of the alkanolammonium salt, and also the dyes of the formula I, II and/or III

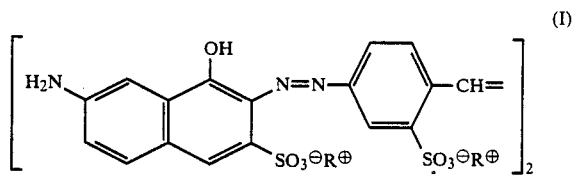

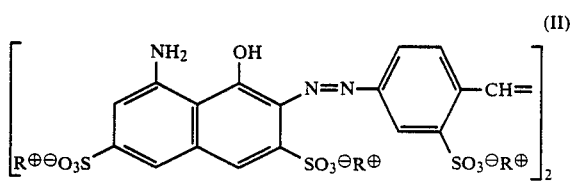

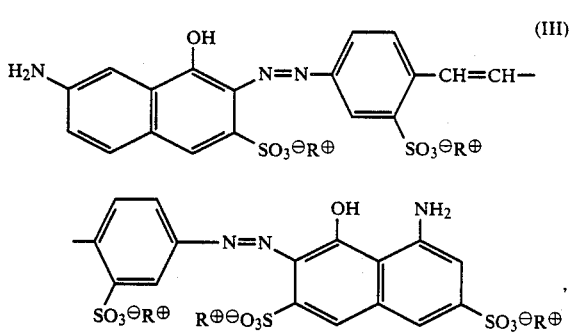

where the cations R+ are each independently of the others an alkanolammonium cation, a substituted or unsubstituted ammonium cation or an alkali metal cation, and the quantities of the individual dyes are such as to produce a black, are suitable in particular for dyeing paper and leather.

4 Claims, No Drawings

LIQUID BLACK DYE MIXTURE

The present invention relates to a liquid aqueous dye mixture for black shades, containing as dyes essentially those dyes which have the C.I. number (Colour Index number) 19,140, 40,000 or 47,035, in the form of the alkanolammonium salt, and also the dyes of the formula I, II and/or III

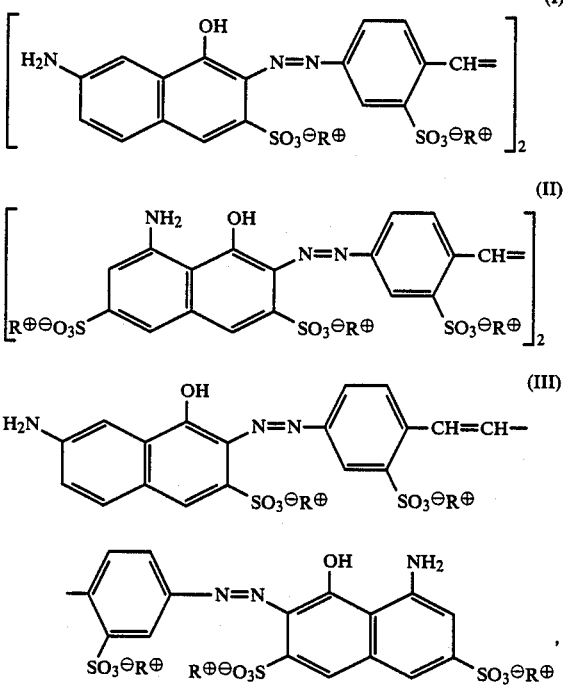

where the cations R⊕ are identical or different and each independently of the others is an alkanolammonium cation, a substituted or unsubstituted ammonium cation or an alkali metal cation, and the quantities of the individual dyes are such as to produce a black.

The dyes represented by the formulae I, II and III are obtained in a conventional manner, advantageously by simultaneous or stepwise coupling of bisdiazotized flavonic acid with 7-amino-1-hydroxynaphthalene-3-sulfonic acid (gamma acid) and 8-amino-1-hydroxynaphthalene-3,6-disulfonic acid (H-acid). The exact composition of the dyes will of course depend on each case on the quantities of starting material used and on the nature of the coupling and can easily be controlled via these parameters. The coupling can also take place in the presence of dyes which have the abovementioned C.I. numbers.

The mixture components are likewise prepared in a conventional manner. Details can be found in the examples.

The anionic dyes should predominantly be present in the form of alkanolammonium salts to guarantee sufficiently high solubility, storage stability and substantial odorlessness of the concentrated solutions in water, which contain in general from 15 to 35% by weight, and preferably from 20 to 30% by weight, of dye, based on the solution.

An alkanolammonium cation R⊕ is derived for example from mono-, di- or triethanolamine, methylethanolamine, ethylethanolamine, dimethylethanolamine, diethyllethanolamine, mono-, di- or tripropanolamine, methyldiethanolamine, ethyldiethanolamine, methylpropanolamine, ethylpropanolamine, dimethylpropanolamine or diethylproanolamine.

Substituted and unsubstituted ammonium ions are derived for example from ammonia, mono-, di- or trimethylamine, mono-, di- or triethylamine, mono-, di- or tripropylamine, mono-, di- or triisopropylamine or mono-, di- or tributylamine.

Alkali metal cations are for example lithium, sodium and potassium ions.

These alkali metal cations are essentially brought in by intermediates, which are customarily used in technical grade purity. The quantities of alkali metal cation thus brought in are tolerable, lithium ions even in high amounts.

Dye mixtures where R⊕ is an alkanolammonium cation are preferred.

In general, the weight ratio between the dyes which have the C.I. numbers 19,140, 40,000 and 47,035 and the dyes of the formulae I, II and III ranges from 1:2 to 1:3.5, based on the free dye acids. The amount of dyes of the formulae I, II and III depends on the weight ratio of gamma acid to H-acid, which in general is chosen to be within the range from 1:0 to 1:3.

Compared with the black mixtures disclosed in US-A-4,118,182, the mixtures according to the invention have the advantage of lower pH sensitivity and higher solubility and stability. Furthermore, they are less costly to produce.

The mixtures according to the invention are suitable in particular for dyeing paper substances and also leather and leather fiber material. The dyeings on paper show no bronzing.

The examples which follow serve to illustrate the invention in more detail. Percentages are by weight, unless otherwise stated.

EXAMPLE 1

To a suspension of 34.6 g of sulfanilic acid in 90 g of water were added 17.5 g of 1,3-bisnitrosyloxy-2,2-dimethylpropane in the course of two hours, and the mixture was subsequently stirred at room temperature for about an hour. After the diazotization had ended, any small nitrite excess was destroyed with a little sulfamic acid. To this suspension was then added 60.4 g of 1-(4-hydroxysulfonylphenyl)pyrazol-5-one-3-carboxylic acid. 56.0 g of 50% strength monoethanolamine were then added dropwise at about 5°–15° C. in the course of one hour. After the coupling had ended, the batch was adjusted with water to a total weight of 370 g.

This solution of the dye C.I. Acid Yellow 23 was then mixed with 1,100 g of the blue dye solution described in Example 4 to produce a concentrated, ready-to-use black formulation.

EXAMPLE 2

74.1 g of 4,4'-diaminostilbene-2,2'-disulfonic acid and 300 g of water were stirred at room temperature. 36.0 g of 1,3-bisnitrosyloxy-2,2-dimethylpropane were added dropwise in the course of about two hours. After three hours of stirring the remaining excess nitrite was destroyed by adding a small amount of sulfamic acid. In the course of 30 minutes and at from 20° to 30° C., the suspension obtained was then run into a thoroughly stirred solution prepared from 300 g of water, 95.7 g of 7-amino-1-hydroxynaphthalene-3-sulfonic acid and 182 g of triethanolamine. The diazotization vessel was subsequently rinsed out with 50 ml of water. After 125 g of urea had been dissolved in the reaction mixture, a further small amount of water was added to bring the total amount to 1,250 g. In this way a storable solution of the dye of the formula I was obtained.

A high-quality liquid black mixture was obtained by mixing the above solution of the dye of the formula I with 310 g of the solution of the yellow dye of C.I. number 47,035. The latter solution was obtained by pouring 267 g of a sulfonation mixture containing 51.6 g of naphthoquinophthalonesulfonic acid into 1,100 parts of water, adding 92.0 g of tri(2-ethylhexyl)amine and stirring for one hour at from 95° to 100° C. After the stirrer was switched off, a phase separation occurred into an oily top layer containing the dye and a clear bottom layer of dilute sulfuric acid, which was separated off and discarded. The oily layer was then successively stirred twice with 450 ml and once with 225 ml of water at from 95° to 100° C., for half an hour each time, after which the hot wash liquor, once the stirrer was switched off, came to the surface together with a portion of the amine used and was separated off.

The dye left behind was then heated to 95° C. together with 30 g of diethylethanolamine, 65 g of 2,2-dimethylpropanediol and 130 ml of water to form an aqueous solution of the dye. After the tri(2-ethylhexyl)amine on the surface had been separated off, the dye solution was adjusted with pure water to a total amount of 310 g and directly used for producing the above black mixture.

EXAMPLE 3

To 310 g of the solution of the yellow dye obtained as described in the second part of Example 2 were added 300 ml of water, 95.7 g of 7-amino-1-hydroxynaphthalene-3-sulfonic acid and 182 g of triethanolamine, followed by the gradual addition of the suspension obtained by bisdiazotization of 74.1 g of 4,4'-diaminostilbene-2,2'-disulfonic acid as described in the first part of Example 2, thereby forming the dye of the formula I in the presence of the dye of C.I. number 47,035 to produce a ready-to-use stock solution of a black color.

EXAMPLE 4

74.1 g of 4,4'-diaminostilbene-2,2'-disulfonic acid were bisdiazotized as described in Example 2. Then, however, the resulting suspension of the bisdiazonium salt was combined in otherwise the same manner with a mixture prepared from 47.9 g of 7-amino-1-hydroxynaphthalene-3-sulfonic acid, 63.9 g of 8-amino-1-hydroxynaphthalene-3,6-disulfonic acid, 200 ml of water and 140 g of triethanolamine. 100 g of urea were added, followed by a small amount of water to adjust the batch to a final weight of 1,000 g. The result obtained was a solution of the dyes of the formulae I, II and III.

In another vessel, 104.4 g of 4-nitrotoluene-2-sulfonic acid were stirred with 630 ml of water and 153 g of 50% strength sodium hydroxide solution, and the mixture was heated to 55°–58° C. for five hours. After cooling down to room temperature, 90.0 g of tributylamine and 280 g of 50% strength sulfuric acid were added, and the mixture was heated to about 100° C. After the mixture had been stirred for 15 minutes, the stirrer was switched off. A yellow oil separated off as a top layer. The bottom, aqueous phase was separated off and discarded.

To the dye phase were added 300 ml of water and 63 g of diethanolamine, and the mixture was stirred at 60° C. for one hour. After the stirrer had been switched off, a colorless layer of tributylamine formed at the surface with an aqueous solution of the yellow dye C.I. Direct Yellow 11 underneath. This solution was separated from the colorless layer and adjusted with water to a total weight of 540 g.

The solution of this yellow dye was then combined with a solution of blue dyes I, II and III to give a ready-to-use black mixture.

EXAMPLE 5

First, a solution of the dye C.I. Direct Yellow 11 was prepared as described in Example 4. To this solution were then added 200 ml of water, 140 g of triethanolamine, 47.9 g of 7-amino-1-hydroxynaphthalene-3-sulfonic acid and 63.9 g of 8-amino-1-hydroxynaphthalene-3,6-disulfonic acid. A suspension of 74.1 g of flavonic acid bisdiazotized as described in Example 2 was then run in with thorough stirring at room temperature in the course of about 30 minutes. The coupling to give the dyes of formulae I, II and III was complete virtually immediately.

Finally, 100 g of urea were added, followed by sufficient water to produce a total of 1,540 g of a ready-to-use, concentrated black mixture.

We claim:

1. An aqueous dye mixture for black shades, containing as dyes essentially (A) at least one dye selected from those dyes which have the C.I. number 19,140, 40,000 or 47,035, in the form of the alkanolammonium salt, and also (B) at least one dye selected from the dyes of the formula I, II or III

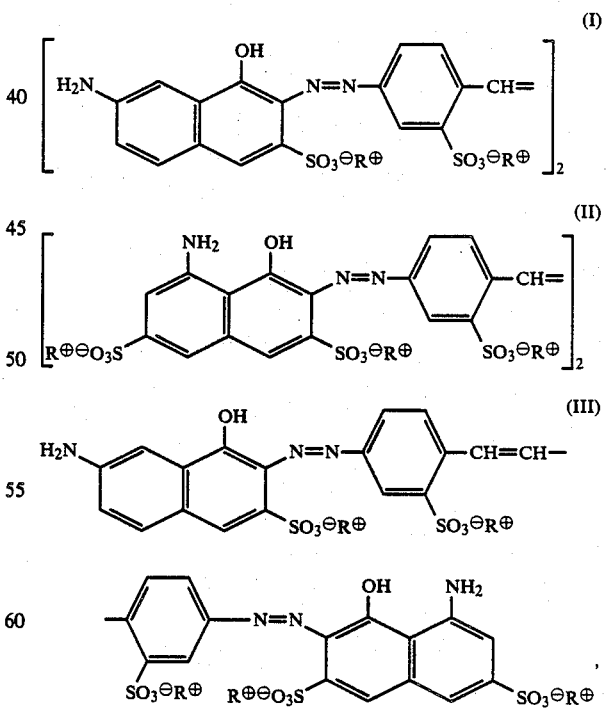

where the cations R+ are identical or different and each independently of the others is an alkanolammonium cation, a substituted or unsubstituted ammonium cation or an alkali metal cation, and the relative proportions of the individual dyes (A) to (B) in the dye mixture are such as to produce a black shade.

2. An aqueous dye mixture as claimed in claim 1, wherein $R^\oplus$ is an alkanolammonium cation.

3. An aqueous dye mixture according to claim 1 wherein the weight ratio between the dyes (A) which have the C.I. numbers 19,140, 40,000 or 47,035 and the dyes (B) of the formulae I, II and III ranges from 1:2 to 1:3.5, based on the free dye acids.

4. An aqueous dye according to claim 3 wherein the weight ratio of the gamma acid to H-acid units in the dye component (B) is within the range of 1:0 to 1:3.

* * * * *

UNITED STATES PATENT AND TRADEMARK OFFICE
CERTIFICATE OF CORRECTION

PATENT NO. : 4,804,387
DATED : Feb. 14, 1989
INVENTOR(S) : Hans-Juergen DEGEN, et al.

It is certified that error appears in the above-identified patent and that said Letters Patent is hereby corrected as shown below:

The following Foreign Application Priority Data should appear on the Title Page:

--Dec. 3, 1986 [DE]  Fed. Rep. of Germany ....... 3641233--

Signed and Sealed this

Tenth Day of October, 1989

Attest:

DONALD J. QUIGG

Attesting Officer

Commissioner of Patents and Trademarks